United States Patent [19]

Robe

[11] 4,281,847

[45] Aug. 4, 1981

[54] TRAILER HITCH

[75] Inventor: T. Richard Robe, Lexington, Ky.

[73] Assignee: The University of Kentucky Research Foundation, Lexington, Ky.

[21] Appl. No.: 68,699

[22] Filed: Aug. 22, 1979

[51] Int. Cl.³ .............................................. B62D 53/00
[52] U.S. Cl. ................................. 280/446 B; 280/488
[58] Field of Search ............... 280/432, 446 R, 446 A, 280/446 B, 449, 450, 451, 452, 483, 484, 486, 487, 488, 492, 493; 64/28 R; 188/1 C; 172/271; 267/154, 155; 403/2

[56] References Cited

U.S. PATENT DOCUMENTS

| | | | |
|---|---|---|---|
| 1,313,451 | 8/1919 | Behlin | 280/484 |
| 1,313,453 | 8/1919 | Behlin | 280/488 |
| 2,238,095 | 4/1941 | Almcrantz | 280/483 X |
| 2,940,776 | 6/1960 | Curtis | 280/446 B |
| 3,237,741 | 3/1966 | Potter et al. | 64/28 R X |
| 3,510,152 | 5/1970 | Fisher | 280/484 |
| 3,550,710 | 12/1970 | Spanski | 280/483 X |
| 3,722,920 | 3/1973 | Reese | 280/446 B |
| 4,037,856 | 7/1977 | Medlin et al. | 280/488 X |

FOREIGN PATENT DOCUMENTS 1064818 9/1959 Fed. Rep. of Germany ........... 280/449
2424 of 1909 United Kingdom ...................... 280/483

*Primary Examiner*—Robert R. Song
*Assistant Examiner*—Randall A. Schrecengost
*Attorney, Agent, or Firm*—Birch, Stewart, Kolasch & Birch

[57] ABSTRACT

The present invention is directed to a trailer hitch for a vehicle. The trailer hitch is designed to be connected to a vehicle and permits two degrees of freedom for the hitchpoint. The first degree of freedom is in a lateral direction which permits the hitchpoint to have freedom to move horizontally in a lateral direction. This degree of freedom is dampened by a viscous dampener to improve the lateral stability of a trailer connected to the hitchball. Further, springs are provided to resist lateral movement and to restore the hitchpoint to its original position during the pulling of a trailer. In addition, a second degree of freedom is provided which permits rotation of the hitchball about a longitudinal axis. Permitting the rotation of the hitchball permits the accidental overturning of a towed vehicle without overturning the towing vehicle.

13 Claims, 4 Drawing Figures

TRAILER HITCH

BACKGROUND OF THE INVENTION

1. Field of the Invention

The present invention is directed to a trailer hitch which has two degrees of freedom for the hitchpoint. The hitchpoint is permitted to move in a lateral direction and is mounted to rotate about a longitudinal axis.

2. Description of the Prior Art

It is conventional to mount a trailer hitch on the back or front of a vehicle, such as a passenger car or truck, to tow a trailer. Conventional trailer hitches are usually classified as bumper hitches, axle hitches, or frame hitches. Each of these hitches consist of a structure which is normally attached to the towing vehicle in a rigid manner. In addition, as is conventional in the trailer hitch art, a hitchball is rigidly affixed to the trailer hitch. The hitchball is a kinematical device which permits articulation between the trailer and the towing vehicle.

Most recent developments in the trailer hitch art have been directed to increasing the strength of the device by increasing the lateral rigidity of the hitch. Further, recent developments have tended to increase the strength of the rear-end of the towing vehicle. As a result of these recent developments, a driver tends to have an increased sense of security while towing a trailer at high speeds. As a result, trailers are often towed at very high speeds and trailer instability develops before the driver realizes what has happened. This situation is extremely dangerous when vehicle control is lost. The trailer often rolls over and correspondingly the trailer hitch tends to also flip over the towing vehicle. This often results in serious injury or death to the occupants of the towing vehicle.

In addition to the conventional trailer hitches discussed above, the Fisher Patent, U.S. Pat. No. 3,510,152, discloses a trailer hitch which will permit free relative pivoting motion while opposing relative pitching and rolling motions. More particularly, the trailer hitch of Fisher provides a means for resisting rolling and pitching movements. This resisting means is a spring which opposes the rolling and pitching motion between the towing vehicle and the towed vehicle. The trailer hitch disclosed by Fisher provides for flexibility only and does not appear to permit a towed vehicle to accidentally overturn while preventing the overturning of the towing vehicle.

The Spanski Patent, U.S. Pat. No. 3,550,710, discloses an innerconnection between two vehicles designed for rough terrain whereby the towing vehicle and the towed vehicle are connected by a spring means and a flexible hose or tube which links together all of the vehicles being towed.

Another prior art patent issued to Almcrantz, U.S. Pat. No. 2,238,095, discloses a means for disconnecting the towing vehicle when the towed vehicle completely overturns. As illustrated in FIG. 2 of Almcrantz, when the towed vehicle is upright the ball 4 is properly seated within the socket 11. However, when the towed vehicle overturns the ball 4 can easily be removed from the socket. This removable connection is possible since the ball 4 is not spherical in shape but rather it is shaped to conform with the shape of the slot 10, as illustrated in FIG. 5 of Almcrantz.

SUMMARY AND OBJECTS OF THE INVENTION

It is a primary object of the present invention to provide a trailer hitch which permits the hitchball to move horizontally in the lateral direction.

Another primary object of the present invention is to provide a trailer hitch wherein the hitch is free to rotate about a longitudinal axis to permit the accidental overturning of a towed vehicle without overturning the towing vehicle.

A further object of the present invention is to provide a trailer hitch wherein lateral movement of the hitchball is dampened by a viscous dampener to improve the lateral stability of the trailer by dampening lateral motions and/or oscillations.

A still further object of the present invention is to provide springs which will resist lateral movement and restore the hitchpoint to its original position during trailer towing operations.

Another object of the present invention is to provide a mounting for a trailer hitch which will permit rotation of the hitchpoint but will maintain the union between the towed vehicle and the towing vehicle even if the towed vehicle should accidentally overturn.

A still further object of the present invention is to provide a trailer hitch which improves the lateral stability of the trailer without adding sway bars or other add-on type devices to reduce trailer snaking.

Another object of the present invention is to provide a trailer hitch which will tend to decouple or soften lateral motion transmitted from the towed vehicle to the towing vehicle.

A still further object of the present invention is to provide a trailer hitch which will warn the driver of an unstable operation of the trailer when hitchpoint oscillations begin.

These and other objects of the present invention are accomplished by providing a trailer hitch which permits two degrees of freedom for the hitchpoint. The first degree of freedom is in a lateral direction and permits the hitchball to move horizontally. The horizontal movement is dampened by a viscous dampening to improve the lateral stability of a trailer by dampening lateral motions and/or oscillations. In addition, springs are provided to resist lateral movement and to restore the hitchpoint to its original position during trailer towing operations. The second degree of freedom permits the hitchpoint to rotate about a longitudinal axis. This rotational motion permits the accidental overturning of a towed vehicle without also overturning the towing vehicle. Although the hitchpoint is permitted to rotate, the union between the towed vehicle is maintained to prevent disengagement of the trailer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
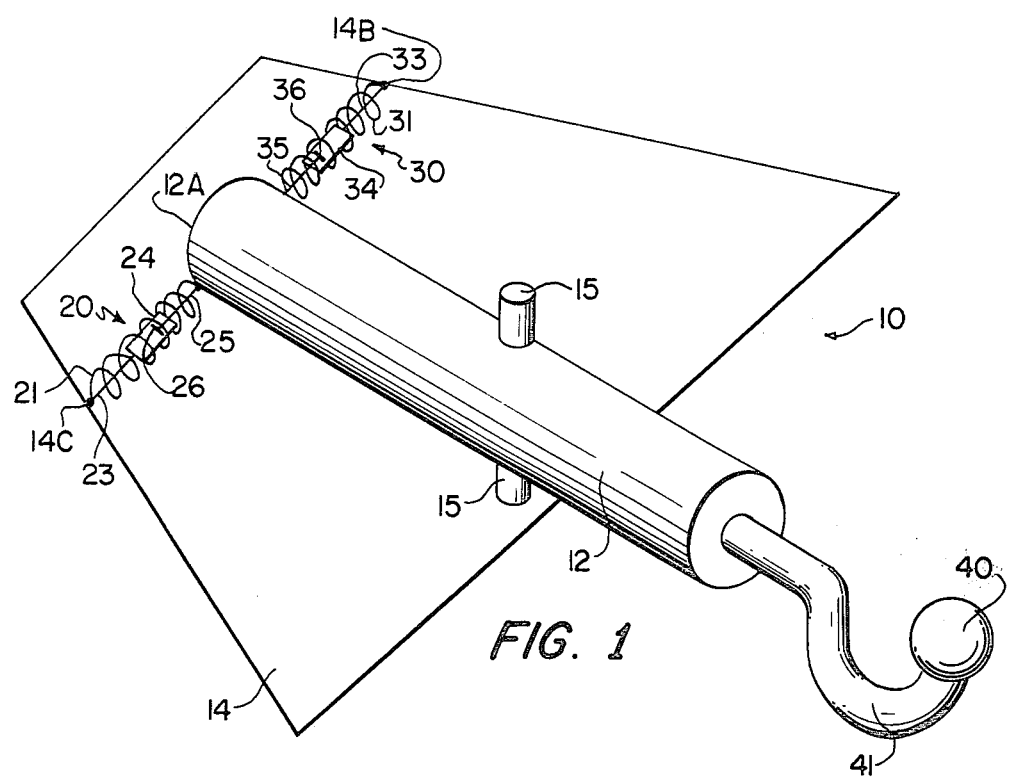
FIG. 1 is a schematic view illustrating a first embodiment of the trailer hitch according to the present invention.
Figure 2:
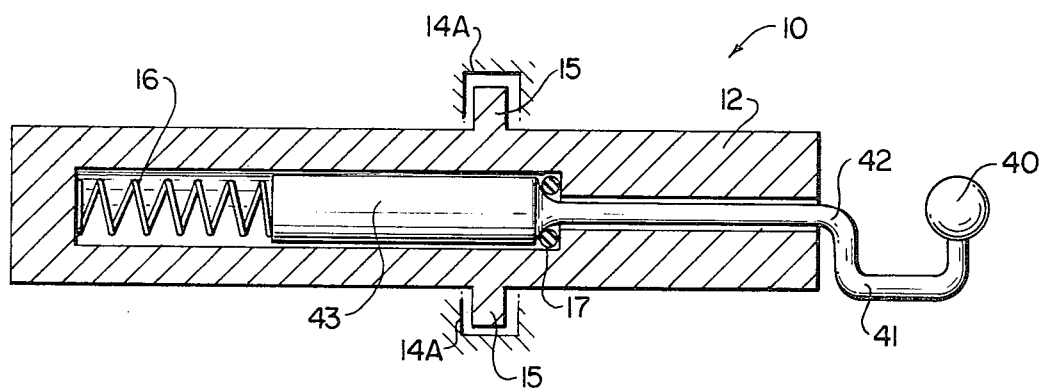
FIG. 2 is a cross-sectional view of the trailer hitch as illustrated in FIG. 1.

FIGS. 1 and 2 schematically illustrate a first embodiment of the present invention. A trailer hitch is generally indicated by character 10. The trailer hitch includes a cylinder or arm 12 which is mounted on a frame 14 so that the cylinder rotates about the pivot points 15. As illustrated in FIG. 2, the pivot points 15 may be mounted within openings 14A disposed in the frame 14. However, any suitable means of mounting the pivot points 15 so as to permit limited rotation of the cylinder 12 would be suitable and are within the spirit of the present invention.

One end of the cylinder 12 is connected to a combination spring and dampener to limit the rotation of the cylinder about the pivot points 15. As illustrated in FIG. 1, a combination spring and dampener unit 30 is positioned on the right side of the end 12A of the cylinder 12. Similarly, a combination spring and dampener unit 20 is positioned on the left side of the end 12A of the cylinder 12.

The combination spring and dampener unit 30 includes a first rod 33 fixed at one end to the mounting 14B of the frame 14 and includes a chamber 34 mounted at the other end thereof. A second rod 35 is affixed at one end thereof to the end 12A of the cylinder 12. A piston 36 is positioned on the other end of the second rod 35 and is freely slidably mounted within the chamber 34. A fluid is positioned in the chamber 34 and flows about the piston 36 to dampen the lateral movement of the cylinder 12 as it rotates about the pivot points 15. In addition, a spring 31 is schematically shown as being positioned between the end 12A and the mounting 14B so as to normally bias the cylinder 12 to its original position.

In a similar manner, the combination spring and dampener unit 20 includes a first rod 23 affixed at one end thereof to the mounting 14C of the frame 14. A chamber 24 is affixed to the other end of the first rod 23. A second rod 25 is affixed at one end thereof to the end 12A of the cylinder 12. A piston 26 is positioned on the other end of the second rod 25 and is freely slidably within the chamber 24. Fluid is positioned within the chamber 24 and flows about the piston 26 to dampen the lateral movement of the cylinder 12 as it rotates about the pivot point 15. In addition, a spring 21 is schematically shown as being positioned between the end 12A and the mounting point 14C so as to normally bias the cylinder 12 to its original position.

As is conventional in the trailer hitch art, a ball 40 is positioned at the end of a rod 41 for mounting with the female member of a trailer. However, if the trailer hitch is mounted on the towed vehicle, the ball 40 could be replaced with a female coupler for connection to a conventional male coupler attached to the towing vehicle.

As illustrated in FIG. 2, the rod 41 includes a stem portion 42 and a shank portion 43. The shank portion 43 and stem portion 42 are mounted for rotation within the cylinder 12. A torsion spring 16 is positioned within the cylinder 12 and biases the shank portion 43 of the trailer hitch outwardly against bearing 17. Further, the torsion spring 16 maintains the original upward orientation of the ball 40.

In operation, the frame 14 is attached to a vehicle. A trailer is connected to the ball 40 in a conventional manner. Limited horizontal and lateral movement of the trailer is permitted because of the connection of the combination spring and dampeners 20, 30 positioned adjacent the end 12A of the cylinder 12. Therefore, the lateral stability of the trailer is improved. The trailer hitch according to the present invention will tend to decouple or soften the lateral motion transmitted from the towed vehicle to the towing vehicle. In addition, since the shaft 42 and shank portion 43 of the trailer hitch are rotatably mounted within the cylinder 12, it is possible that the trailer may be accidentally overturned without also overturning the towing vehicle. Further, the towed vehicle may accidentally overturn without disengaging the union between the towed vehicle and the towing vehicle.

The spring 16 is a torsion spring which resists rotation of the shank portion 43 and the rod portion 42 of the trailer hitch within the cylinder 12. The spring 16 maintains the trailer hitch in its normal upright position. However, if the towed vehicle should accidentally overturn, the spring 16 would permit rotation of the shank portion 43 and the rod portion 42 of the trailer hitch.

Figure 3:
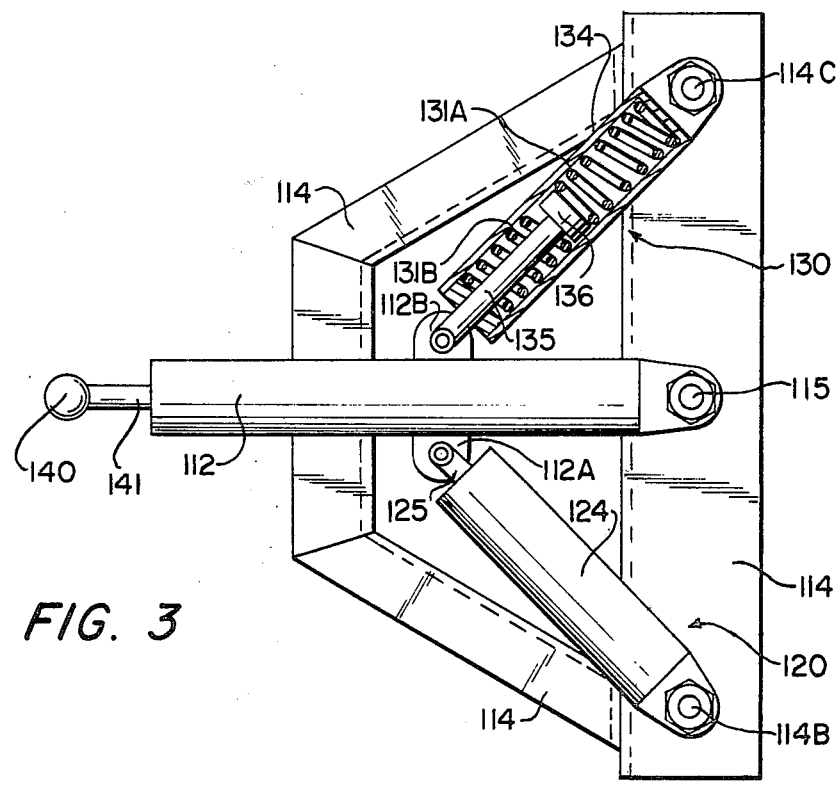
FIG. 3 is a plan view of a second embodiment of the trailer hitch according to the present invention.
Figure 4:
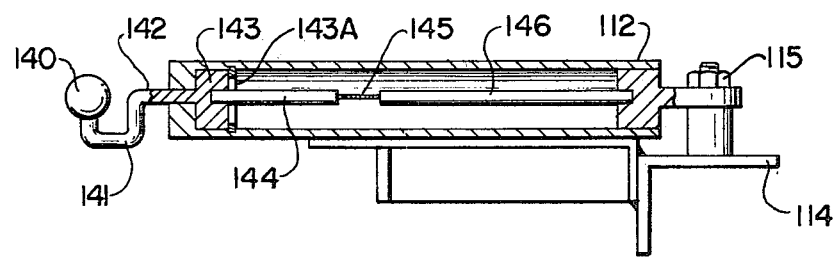
FIG. 4 is a cross-sectional view of the trailer hitch as illustrated in FIG. 3.

A second embodiment of the present invention is illustrated in FIGS. 3 and 4. A frame 114 is designed for mounting on a towing vehicle. A cylinder or arm 112 is pivotally mounted to the frame 114 at pivot point 115. Two flanges 112A, 112B are mounted along the length of the cylinder 112. A combination dampener and spring is mounted between each of the flanges 112A and the frame 114.

The combination dampener and spring units 120, 130 are substantially identical. The combination dampener and spring unit 120 is positioned between the flange 112A and a mounting pivot point 114B. Similarly, the combination dampener and spring unit 130 is mounted between the flange 112B and a pivot point 114C.

The combination dampener and spring unit 120 includes a chamber 124 which is affixed to the pivot point 114B. In addition, a piston rod 125 includes a piston (not shown) and is mounted within the chamber 124. One end of the piston rod 125 is pivotally mounted on the flange 112A.

The combination dampener and spring unit 130 is substantially the same as the unit 120. As illustrated in FIG. 3, the combination dampener and spring unit 130 is shown in a partial cross-sectional view illustrating a piston 136 mounted within the chamber 134. The chamber 134 is pivotally mounted to the frame at 114C. One end of a piston rod 135 is pivotally mounted on the flange 112B. The piston 136 is affixed to the other end of the piston rod 135. The piston 136 is slidably received within the chamber 134. Fluid is positioned within the housing 134 and flows about the piston 136 to dampen the lateral movement of the cylinder 112 as it rotates about the pivot point 115. In addition, a spring 131A is mounted between one side of the piston 136 and one end of the housing 134. Similarly, a spring 131B is mounted between the other side of the piston 136 and the other end of the housing 134. The springs 131A, 131B are designed to return the dampener to its original position thereby returning the cylinder 112 to its original position.

The operation of the combination dampener and spring unit 120 is identical to the operation of the combination dampener and spring unit 130. The two units act together to improve the lateral stability of a trailer connected to the trailer hitch. In addition, the trailer hitch according to the present invention will tend to decouple or soften the lateral motion transmitted from the towed vehicle to the towing vehicle.

FIG. 4 illustrates a cross-sectional view of the trailer hitch illustrated in FIG. 3. The trailer hitch includes a conventional ball 140 mounted on an arm 141. The arm 141 is integral with the shaft portion 142 and a shank portion 143. The shaft portion 142 and the shank 143 are mounted within the cylinder 112. A retaining ring 143A retains the shank portion 143 adjacent to the outermost end of the cylinder 112. A shaft 144 is connected at one end thereof to the shank portion 143. The other end of the shaft 144 is connected to a safety link 145. In turn, the safety link 145 is connected to a second shaft 146 which is mounted within the other end of the cylinder 112. The safety link 145 may be a rod of reduced diameter or may be a torsion spring.

The embodiment of the present invention illustrated in FIGS. 3 and 4 is designed so that the shank portion 143 is normally positioned adjacent to the outermost end of the cylinder 112. However, when a trailer is connected to the ball 140 and accidentally overturns, the shank portion 143 will rotate within the cylinder 112 and sever the safety link 145. In the alternative, if the safety link consists of a torsion spring, the rotation of the shank portion 143 will tend to rotate the torsion spring. In this manner, a trailer connected to the trailer hitch may accidentally overturn without causing the towing vehicle to overturn.

The embodiment of the present invention illustrated in FIGS. 3 and 4 is designed to be mounted on a rear bumper or frame of a vehicle. However, mounting the vehicle hitch according to the present invention to an axle or other frame member is within the spirit of the present invention.

As illustrated in FIGS. 1-4, the center of the hitchball must be on centerline of the longitudinal axis of the stem portion 42 or the shaft 144 so that there is no torque about this longitudinal axis during normal towing operation. However, torque will develop about this longitudinal axis if a towed vehicle should accidentally overturn.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A trailer hitch for a vehicle which permits two degrees of movement for a hitchpoint in addition to the normal rotational freedoms provided by a ball joint comprising:

a frame adapted to be attached to a vehicle;

a hitchpoint being mounted for limited lateral movement on said frame to soften the lateral motion transmitted from a towed vehicle to a towing vehicle;

dampener means operatively connected to said hitchpoint and said frame for stabilizing said lateral movement of said hitchpoint thereby reducing sway of the towed vehicle;

spring means operatively connected to said hitchpoint and said frame to bias said hitchpoint to a first predetermined position; and said hitchpoint being mounted for rotary motion relative to said frame to rotate about a longitudinal axis of the towing vehicle thereby permitting the towing vehicle to remain upright in the event the towed vehicle is turned over.

2. A trailer hitch according to claim 1, said hitchpoint being mounted on a rod and one end of said rod being rotatably positioned within a cylinder.

3. A trailer hitch according to claim 2, wherein said cylinder is pivotally mounted to said frame for pivotally mounting said hitchpoint.

4. A trailer hitch according to claim 1, said dampener means including a piston slidably positioned within a chamber containing a fluid, said fluid flowing about said piston when a force is exerted thereagainst.

5. A trailer hitch according to claim 1, said spring means including at least a pair of spring means operatively positioned on each side of said hitchpoint to bias said hitchpoint to said first predetermined position.

6. A trailer hitch according to claim 1, said dampener means including at least a pair of dampener means operatively positioned on each side of said hitchpoint for stabilizing said lateral movement of said hitchpoint.

7. A trailer hitch according to claim 5, wherein said hitchpoint includes an arm being pivotally mounted to said frame adjacent to approximately the centerpoint thereof and said pair of spring means being operatively mounted adjacent to each side of an end of said arm to bias said hitchpoint to said first predetermined position.

8. A trailer hitch according to claim 5, wherein said hitchpoint includes an arm being pivotally mounted to said frame adjacent to one end thereof and said pair of spring means being operatively mounted along and adjacent to each side of approximately a central portion of said arm to bias said hitchpoint to said first predetermined position.

9. A trailer hitch according to claim 6, wherein said hitchpoint includes an arm being pivotally mounted to said frame adjacent to approximately the centerpoint thereof and said pair of dampener means being operatively mounted adjacent to each side of an end of said arm for stabilizing said lateral movement of said hitchpoint.

10. A trailer hitch according to claim 6, wherein said hitchpoint includes an arm being pivotally mounted to said frame adjacent to one end thereof and said pair of dampener means being operatively mounted adjacent to each side of a central portion of said arm for stabilizing said lateral movement of said hitchpoint.

11. A trailer hitch according to claim 2, wherein said rod mounted within said cylinder is operatively connected to a torsion spring for permitting rotation while normally biasing said hitchpoint to an upright position.

12. A trailer hitch according to claim 2, wherein said rod mounted within said cylinder is connected to a second rod of reduced diameter, said second rod being severed when a predetermined force is applied thereto to permit rotation of said hitchpoint.

13. A trailer hitch for a vehicle which permits a degree of movement for a hitchpoint in addition to the normal rotational freedoms provided by a ball joint comprising:

a frame adapted to be attached to a vehicle;

a hitchpoint being mounted for limited lateral movement on said frame to soften the lateral motion transmitted from a towed vehicle to a towing vehicle;

dampener means operatively connected to said hitchpoint and said frame for stabilizing said lateral movement of said hitchpoint thereby reducing sway of the towed vehicle; and spring means operatively connected to said hitchpoint and said frame to bias said hitchpoint to a first predetermined position.

* * * * *